June 30, 1964 P. J. FREY 3,139,245
TURBULENCE GRID AT THE INLET OF A WING SUBMERGED FAN
Filed May 24, 1963 2 Sheets-Sheet 1

INVENTOR.
PETER J. FREY
BY Knox & Knox

June 30, 1964            P. J. FREY            3,139,245

TURBULENCE GRID AT THE INLET OF A WING SUBMERGED FAN

Filed May 24, 1963            2 Sheets-Sheet 2

INVENTOR.
PETER J. FREY
BY Knox & Knox

United States Patent Office 3,139,245
Patented June 30, 1964

3,139,245
TURBULENCE GRID AT THE INLET OF A WING SUBMERGED FAN
Peter J. Frey, San Diego, Calif., assignor to Ryan Aeronautical Co., San Diego, Calif.
Filed May 24, 1963, Ser. No. 282,960
1 Claim. (Cl. 244—12)

The present invention relates to aircraft and more specifically to a turbulence grid at the inlet of a wing submerged fan.

In aircraft having ducted fans submerged in the wings for vertical take-off thrust, the airflow during transition between vertical and horizontal flight and during horizontal flight while the fans are in use causes losses in fan efficiency. For example, the airflow across a wing duct in forward flight causes separation in the forward portion of the duct and stagnation at the rear of the duct. The air flows through the duct at an angle relative to the duct axis and efficiency may be reduced up to 60%. Also, in forward flight, the forward speed causes a ram air flow into the duct, resulting in increased mass flow. This can be accommodated by a variable pitch fan but, for simplicity and to save weight, a fixed pitch fan is desirable. With a fixed pitch fan the ram air causes ram drag and the fan blades may stall at certain positions in the duct due to nonuniform incoming flow. To obtain maximum efficiency from a simple fixed pitch fan, it is desirable to have substantially constant mass flow through the duct in vertical and lateral flight conditions.

The primary object of this ivnention, therefore, is to provide a turbulence grid at the inlet of a wing submerged ducted fan which creates a stable turbulent boundary layer with substantially uniform pressure distribution over the entire fan disc area, regardless of the direction of incoming air flow relative to the fan.

Another object of this invention is to provide a turbulence grid which has an effect similar to that of guide vanes and which makes it unnecessary to have a large inlet radius in the duct, thus decreasing the overall height of the duct.

A further object of this invention is to provide a turbulence grid which is entirely contained within the wing airfoil and offers a minimum of actual obstruction to the airflow.

With these objects in view the present invention consists in the novel arrangement and combination of elements, as described in the specification, pointed out in the claim and illustrated in the drawings, in which:

Similar characters of reference indicate similar or identical elements and portions throughout the specification and throughout the views of the drawing.

*Aerodynamic Characteristics*

Figure 1:
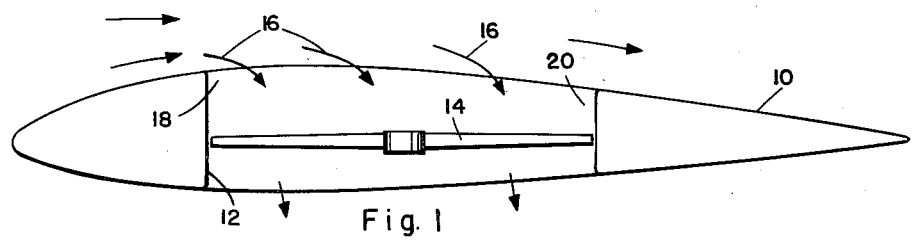
FIGURE 1 is a diagrammatic view of a wing airfoil showing airflow through a fan duct.

With reference to FIGURE 1, a wing 10, illustrated diagrammatically in airfoil section, is provided with a vertical duct 12 containing a driven fan 14 to produce vertical lifting thrust. In vertical flight or when hovering the airflow is generally axially through the duct. In forward flight, however, the airflow moving rearwardly over the wing is drawn down into duct 12, as indicated by directional arrows 16. The flow is thus moving across the duct from front to rear and a zone of separation 18 occurs at the forward portion of the duct, while a stagnation zone 20 occurs at the rear of the duct above the fan. The pressure distribution across the fan disc is uneven, with a reduced pressure at the separation zone 18, resulting in increased effective thrust at the rear of the duct. This results in a pitching action tending to lift the rear of the wing in forward flight, which is undesirable. The situation is also peculiar to the so-called flying platform type of vehicle which comprises a ducted rotor or rotors with sufficient attached structure to carry a payload. To avoid the pitching action and provide more efficient fan operation, a turbulence grid can be employed as hereinafter described.

*Basic Structure*

Figure 2:
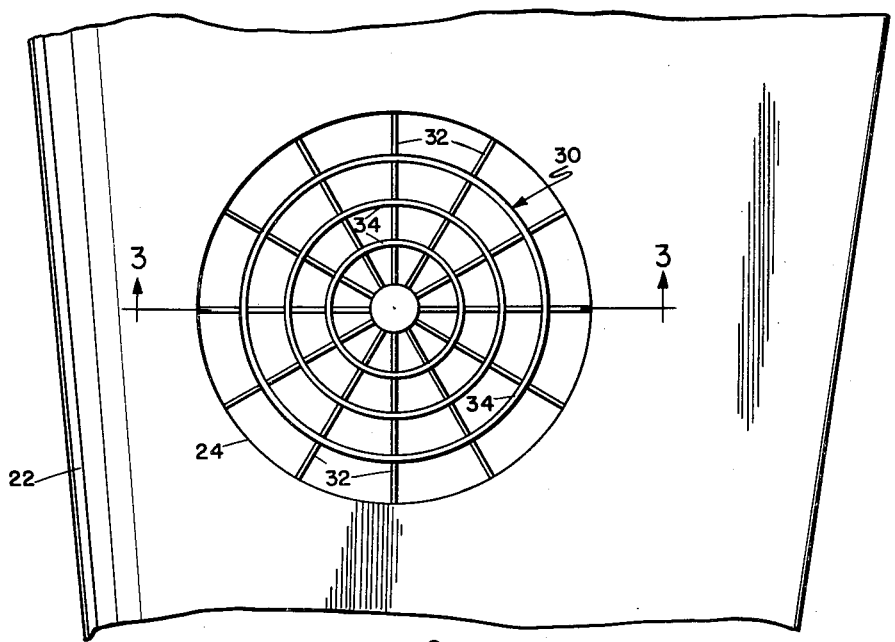
FIGURE 2 is a fragmentary top plan view of a wing incorporating the turbulence grid.
Figure 3:
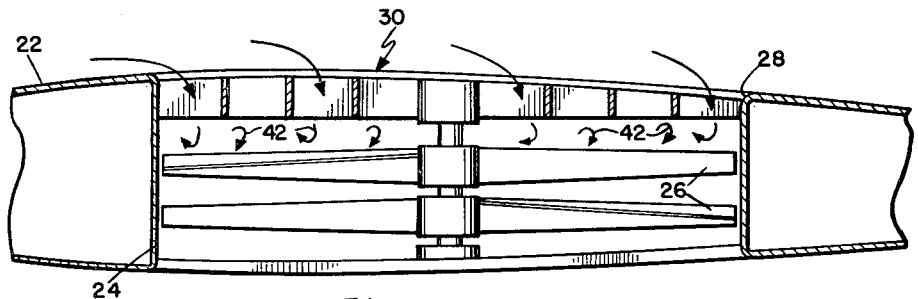
FIGURE 3 is an enlarged section view taken on line 3—3 of FIGURE 2.

In FIGURES 2 and 3, the wing 22 is provided with a vertical circular duct 24 in which are fans 26, driven by any suitable means. The upper or inlet end of duct 24 has a smoothly curved entry lip 28 which can be of small radius. Fixed in the inlet end of duct 24 is a turbulence grid 30 comprising a plurality of first grid members, illustrated as radial members 32, intersecting a plurality of second grid members, illustrated as concentric ring members 34, in a unitary structure. The number and spacing of the thin blade-like members can vary considerably. Turbulence grid 30 is illustrated as being recessed slightly into the duct 24, so that the duct can be closed by flush doors or panels if necessary, but the grid could be coextensive with the upper wing surface. In either case the grid is entirely contained within the wing airfoil contours.

With the proper choice of materials and sizes of members 32 and 34, the grid 30 can form a continuation of the wing structure across duct 24, so simplifying the stressing problems of a large open duct in the main wing structure.

*Alternative Grid Structure*

Figure 4:
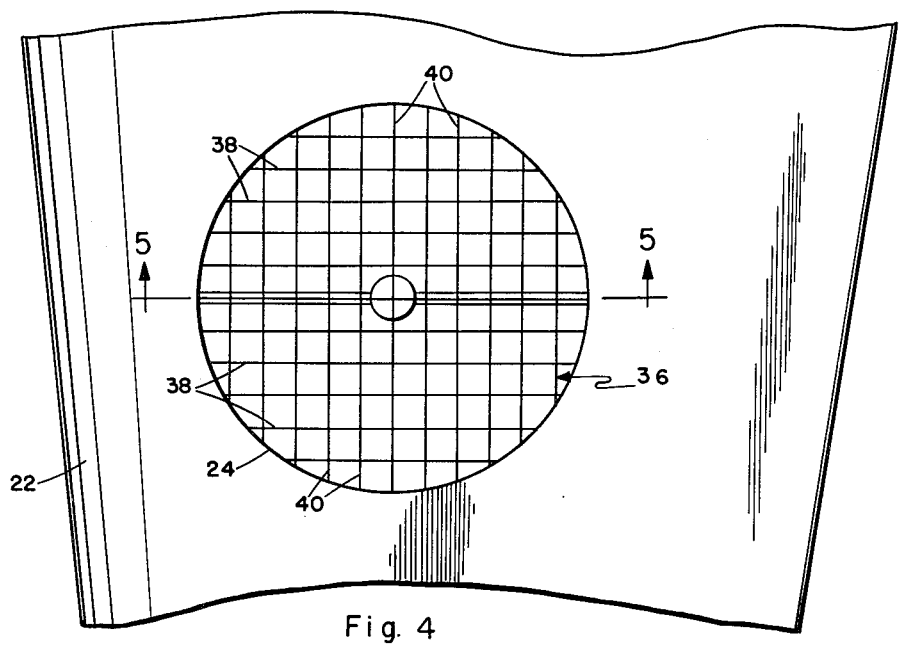
FIGURE 4 is a top plan view of an alternative grid structure.
Figure 5:
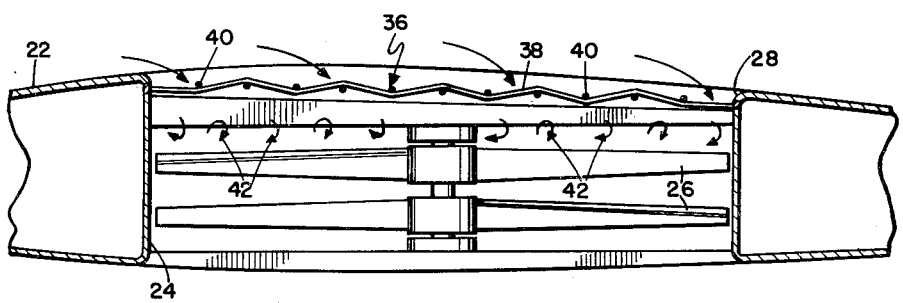
FIGURE 5 is an enlarged sectional view taken on line 5—5 of FIGURE 4.

The wing 22, duct 24 and fans 26 in FIGURES 4 and 5 are similar to the arrangement described above, but the turbulence grid 36 is composed of first grid members 38 intersecting second grid members 40. All of the grid members are illustrated as wire or rod elements and form a unitary grid, the members being spaced to provide any required size of openings.

It should be noted that the thin blade-like members of grid 30 could be arranged in the square opening pattern of grid 36. The blade-like members have the advantage of strength and act as air flow guides, while the wire type grid is structurally more simple.

*Operation*

In vertical or hovering flight airflow is generally downwardly through the duct, the thin cross section grid members offering a minimum of interference.

As soon as forward flight begins the air flows from front to rear and must turn downwardly into the duct. The action is generally the same for either turbulence grid 30 or 36. The turbulence grid causes the airstream to be turned downwardly abruptly and broken up into a turbulent layer immediately below the grid, as indicated by directional arrows 42 in FIGURES 3 and 5. Rather than being a disadvantage, the turbulence establishes a boundary layer of substantially uniform pressure across the entire fan disc area. This boundary layer prevents ram air flow and ensures that the simple, fixed pitch fans will operate efficiently in lateral as well as vertical flight. The thrust of the fans is more constant and predictable at all times, while pitching action is virtually eliminated. Since pressure distribution is more uniform across the fan disc area, uneven or oscillating loads on the fan bearings are minimized and stressing is simplified.

While turbulence is usually considered to be undesirable aerodynamically, it has been found that the inlet pressure loss due to the turbulent layer formation is more than offset by the increase in fan performance made possible by the uniform pressure distribution resulting from the turbulence. In addition, the turbulence grid, in turning the transverse air flow rapidly down into the duct, has the effect of guide vane structure and makes it unnecessary to have a large inlet radius in the duct to induce smooth inlet flow. The grid 30 is particularly effective in this respect. This reduces the overall height of the duct and facilitates installation of submerged fans in a thin high speed wing.

Directional control vanes and flaps normally associated with this type of ducted fan installation are omitted for simplicity, but it will be obvious that their effectiveness would be improved by the more uniform fan air flow.

It is understood that minor variation from the form of the invention disclosed herein may be made without departure from the spirit and scope of the invention, and that the specification and drawings are to be considered as merely illustrative rather than limiting.

I claim:

In combination with an aircraft wing having a ducted fan duct extending through the wing, a turbulence grid, comprising:

a plurality of first grid members and a plurality of second grid members intersecting to form a unitary grid;

said grid being fixed in said duct at the inlet end thereof and being constructed and arranged to intercept incoming air flow and cause a layer of turbulent flow in the vicinity of the downstream side of the grid;

said grid members being thin blade-like elements having their face parallel to the general direction of air flow through the duct and the edges of said elements at the inlet end of the duct being coextensive with the surface contours of the wing.

References Cited in the file of this patent

UNITED STATES PATENTS

| | | |
|---|---|---|
| 1,964,179 | Roth | June 26, 1934 |
| 2,308,477 | James | Jan. 12, 1943 |
| 2,880,945 | Crane | Apr. 7, 1959 |
| 3,043,538 | Taylor | July 10, 1962 |
| 3,080,137 | Hurel | Mar. 5, 1963 |